Figure 1:
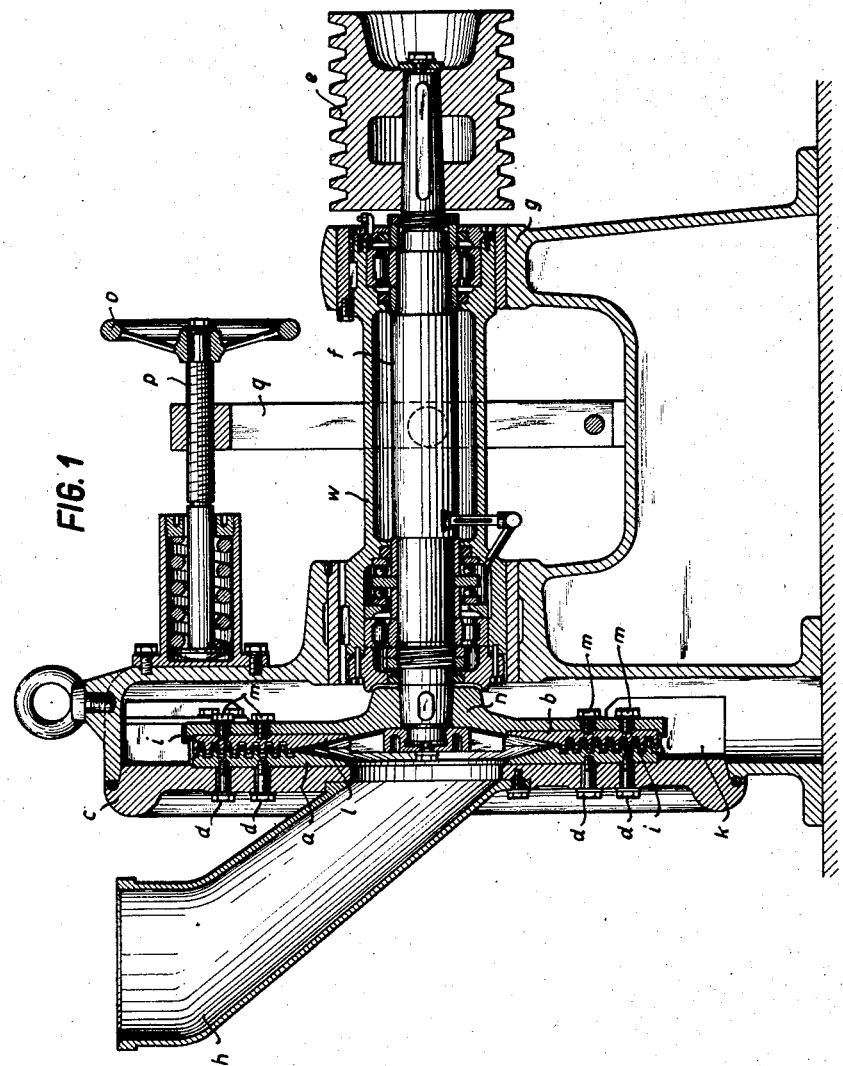

FIG. 2
FIG. 3
FIG. 4
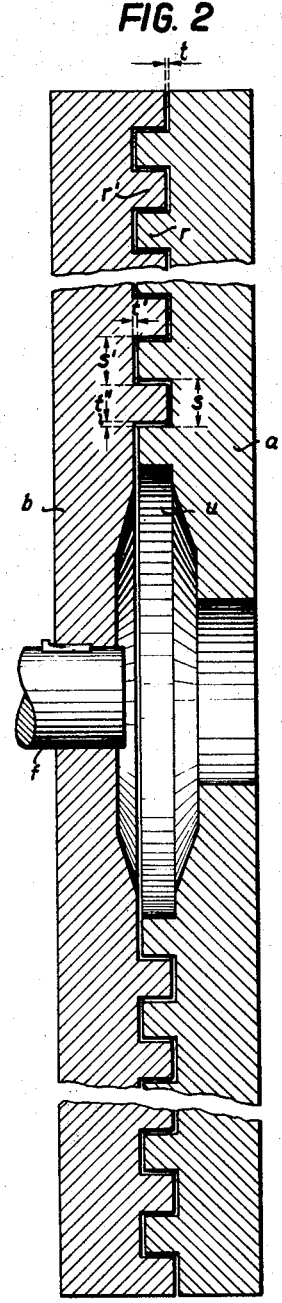
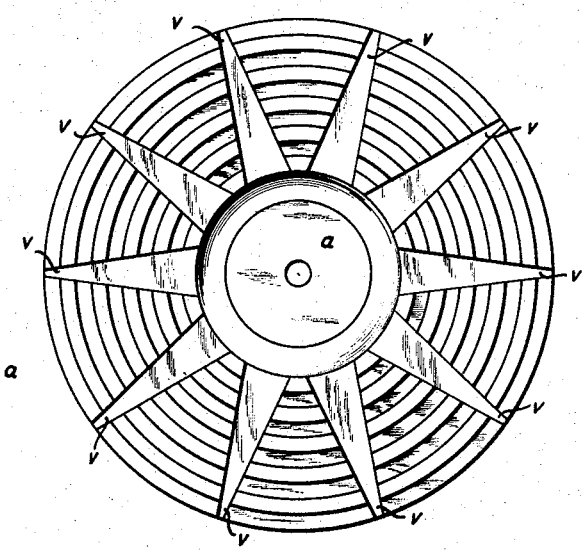
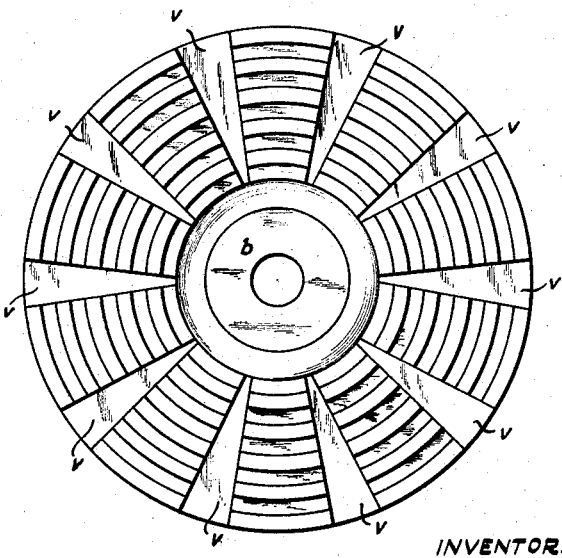
INVENTORS
Wilhelm Reerink
Walter Muschenborn
Erich Notzold
by Malcolm W. Fraser
attorney Nov. 11, 1958 W. REERINK ET AL 2,859,917
PROCESS FOR RE-WETTING WATER-WETTED SOLID PARTICLES
Filed Aug. 23, 1955 3 Sheets-Sheet 3

INVENTORS
Wilhelm Reerink
Walter Muschenborn
Erich Notzold
by Malcolm W. Fraser
attorney

United States Patent Office 2,859,917
Patented Nov. 11, 1958

2,859,917

PROCESS FOR RE-WETTING WATER-WETTED SOLID PARTICLES

Wilhelm Reerink, Essen-Bredeney, Walter Müschenborn, Essen, and Erich Nötzold, Essen-Haarzopf, Germany Application August 23, 1955, Serial No. 530,144

Claims priority, application Germany August 25, 1954

2 Claims. (Cl. 241—15)

This invention relates to a process for re-wetting water-wetted solid particles, with oil for example, and to apparatus suitable for carrying the process into effect.

The problem of such a changing of a wetting substance is met with in many chemical and other processes, more particularly dressing processes. A typical and particularly important example is the method of dressing coal, ores and other minerals which is known per se and in which the mineral particles dispersed in water are subjected, in the presence of the oil or other bituminous substances used for replacing the water, to a controlled treatment as a result of which they have turbulence effects imparted thereto and are then forced through narrow cross-sections. By this method the water-coated solid particles are subjected to shearing and frictional forces which cause the destruction of the water envelope about the mineral particles to be recovered, and said envelope is replaced by a water-repellent oil film, whilst the mine waste particles remain hydrophilic, so that the subsequent separation of the two components of the mixture by mechanical methods is simplified.

This controlled treatment can in itself be carried out in high-speed agitators, for example, but owing to the length of time required to effect interchange of the wetting substances such devices do not permit of continuous operation and their output is much too small for operations on an industrial scale.

It has been found in practice that particularly suitable apparatus for carrying out such re-wetting processes are the so-called baffle-plate mills in which the mixture of oil and solid materials dispersed in water is subjected to the action of contra-rotating baffle plates, or beaters rotating between said baffle plates, whereby it is forced in a condition of great turbulence through the narrow annular gap between the baffle plates and thereby, after it has been subjected to the requisite shearing and frictional forces, relieved of stress suddenly after the preceding pressure effect. It has been found, however, that the success achieved by means of these and other known devices is reduced in proportion to increasing grain fineness of the particles of solid material and that the devices become inadequate when such constituents, for example of a grain size of 10 to 60 microns, preponderate.

This phenomenon is evidently due to the fact that when fine material of this order is being treated by means of the known devices, such a fine division of the liquid medium occurs that it temporarily changes into a partly atomised form. This causes the intervals between the individual particles of material to become so great that the solid particles and the oil particles can no longer come into contact with one another in the mass to enable the shearing and frictional forces necessary for adequate re-wetting to be produced between said particles.

The invention derives from this knowledge, and provides a process whereby re-wetting of even the smallest particles, i. e. of the above-mentioned order of magnitude, can be achieved effectively, whilst preventing the dispersion used for treatment from becoming even temporarily atomised or broken up into spray during the course of treatment, and whereby even under these conditions the particularly intensive shearing force and frictional action necessary for re-wetting such very fine-grained mixtures of materials are obtained, together with the ability to achieve continuous production and high output which are necessary if the process is to be capable of industrial use.

According to the invention the mixture of the very fine particles of solid material which are to be re-wetted, comprising a large proportion of a grain size of between 10 and 60 microns, together with water and oil is brought to the form of a continuous liquid film of comparatively small thickness, i. e. of the order of fractions of a millimetre up to at the most 3 mm., and is subjected in this condition to large shearing and frictional forces which are preferably produced by passing the film continuously through a channel having a plurality of changes of direction and whose walls guiding the film are moved relatively to one another.

In the preferred embodiment of the new process the mixture containing water and oil is guided through an annular gap, while undergoing suitable changes of direction, between two disc-like bodies of revolution having projecting and recessed portions which engage in one another and form the gap and undergo rotational movement at high speed with respect to one another, said mixture being guided between said disc-like bodies from the centre thereof towards the periphery. In this case the movement of the material is effected by the rotational movement of the discs with respect to one another, assisted by centrifugal force.

The annular gap may be formed in different ways but it should particularly be borne in mind that it is necessary to consider whether the particles of solid material are more or less readily re-wettable. The requirement for frequent changes of direction, which are necessary more particularly when turbidity is caused by constituents which are not readily re-wettable, may be complied with, for example, by constructing the annular gap in the manner of a labyrinth, this being achieved by providing on the two relatively rotatable bodies annular ridges and grooves which co-operate with one another by engagement of the ridges within the grooves. Such an arrangement at the same time substantially increases the effective surface of the discs in a manner which is important to the successful outcome of the treatment.

Apparatus which is particularly suitable for carrying out the process comprises, as its basic essentials, two vertically (or if necesary horizontally) disposed disc-like bodies of relatively small width having rectangular, triangular or trapezoidal annular grooves and ridges which alternate with one another and which engage in one another concentrically with a clearance the size of which determines the width of the intervening gap and therefore the width of the turbid film. The inner or outer disc-like body, or if necessary both disc-like bodies, are rotationally driven by a suitable drive in the same or opposite direction at speeds lying within the range of 100 to 3,000 revolutions per minute, according to requirements. The speeds of rotation and other conditions must be so chosen as to provide the most favourable relative movement for the turbid mixture to be treated, this being ascertained empirically, and also a corresponding influencing of the slime and oil mixture which is introduced by way of the central zone of the discs into the annular gap and is thereby brought to the form of an enclosed film of suitable thickness.

The dimensions of the effective zones of the disc surface and of the annular ridges and grooves which are formed therein and engage in one another are chosen more particularly in dependence on the viscosity of the slime-oil mixture which is to be treated. Such dimensions increase in inverse proportion to the viscosity in order to achieve the necessary speed of rotation and the necessary flow resistance and the requisite duration of passage. Moreover, in dependence on these conditions, either the irregular variation in the annular gaps afforded by a rectangular cross-sectional configuration or the regular variation afforded by a trapezoidal cross-section may be found to be more efficient.

In order to influence the flow resistance and thus the shearing and frictional forces produced, in a manner which still further improves the effect of the new process, the concentric annular groves and/or ridges may be interrupted in turn by radial recesses of various forms which, for example, have the general form of a rectangle or a triangle whose base in one of the two disc-like bodies, for example a stationary body, is directed towards the axis of the disc, and in the other, for example a rotary body, is directed towards the periphery thereof, i. e. they widen in the direction of the base. These recesses may be relatively wide in the region of the base—of the order of approximately 60 mm.—and impart a particularly high turbulence to the film and correspondingly increased frictional and shearing forces.

To obtain the highest possible output it has been found that it is particularly advantageous to give the radial grooves a form such that their cross-section decreases in the direction of the outer diameter and is also, if necessary, given a circular or elliptical shape.

With the aim of increasing the speed at which the material reaches the inner end of the labyrinth gap and thus of increasing the output of the apparatus it is possible, if so required, to arrange on the shaft of the said apparatus a propeller or the like which rotates simultaneously with one of the discs.

It has been found that, provided the operation of the apparatus has been suitably adapted, the hydrophilic solid particles of a turbid mixture which have passed through an apparatus of the aforesaid basic construction are completely re-wetted, even in the case of the finest particle sizes, so that in the aforementioned case of a coal dressing process, for example, it is easy to separate the turbid mixture by a mechanical method known per se into oil-wetted coal particles and waste water containing mining waste.

Figure 5:
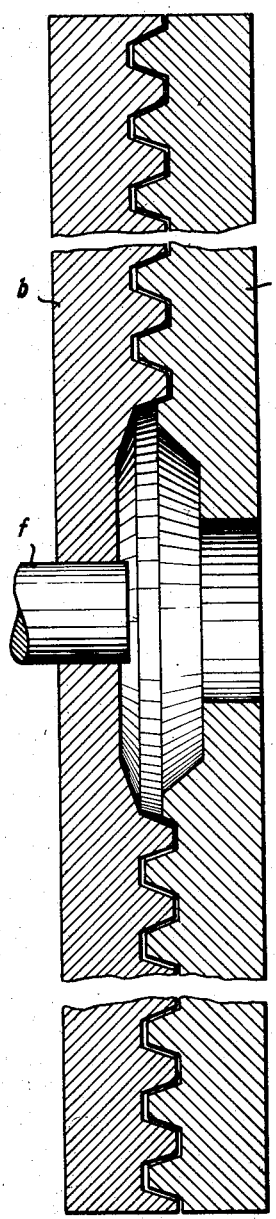
Figure 6:
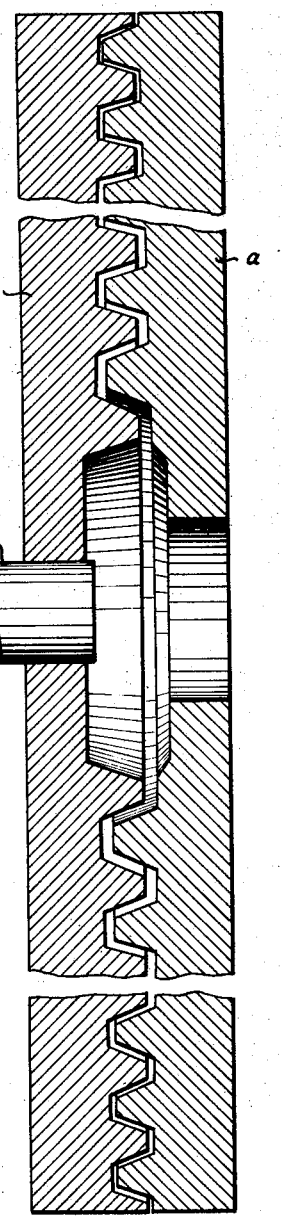

An apparatus for carrying into effect the process according to the invention is illustrated by way of example in the accompanying drawings, in which:

Figure 1 illustrates the general arrangement of a baffle-plate mill of the Pallmann type constructed according to the invention, Figure 2 is a vertical sectional view through the parts of this mill which engage in one another forming a gap profiled according to the invention, Figures 3 and 4 are diagrammatic plan views of a disc illustrating the arrangement of the annular gap and the recesses which interrupt said gap, and Figures 5 and 6 show further possible methods of profiling the gap, the views being similar to that of Figure 2.

The baffle-plate mill illustrated in Figure 1 has the disc-like bodies *a* and *b* arranged in a fluid-tight housing *c*, the disc-like body *a* being fixed to the housing by means of the screws *d* whilst the disc-like body *b* is rotationally driven by a shaft *f* driven by a V-belt pulley *e* and which is mounted in ball-bearings in the frame *g* of the apparatus. A delivery pipe *h* is provided through which the turbid substance to be treated is introduced into the centre of the housing *c*. Externally of the plates *a* and *b* the housing forms an annular channel into which the turbid mixture flows after passing the labyrinth gap *i* which is formed by suitable profiling, leaving the apparatus in the re-wetted condition by a discharge duct *k* which is only shown diagrammaticallly.

As may be seen, the rotating disc *b* is constructed in two parts, the profiled effective part *l* being connected by means of screws *m* to the part *n* which is fixed to the hub of the shaft, so that the part *l* may be replaced by an interchangeable part when worn. A hand wheel *o* is mounted on a spindle *p*. The head of the spindle is supported by the housing and a member *q* connected to a sleeve *w* which surrounds the shaft and is displaceable therewith is in screw-threaded engagement with the said spindle so that, by turning the hand wheel, the sleeve is displaced axially along with the shaft and thus the width of the labyrinth gap *i* may be varied.

Figure 2 shows the formation of the labyrinth gap between the two disc-like bodies *a* and *b* by means of annular ridges *r*, *r'* and annular grooves *s*, *s'* which are arranged on the discs and, according to the constructional example, are formed with a rectangular profile. This gap *t* therefore comprises vertical passages *t'* and horizontal passages *t"*. According to particular requirements its width is of the order of 0.2 to 1.5 mm., or slightly more, and the height of the annular ridges or grooves is in the range of 6 to 8 mms. The disc *b* is driven at a high rotational speed by the drive (not shown) connected to the shaft *f*. The radius of the discs may amount to approximately 20 cms., for example and within in this range a corresponding number of annular grooves and ridges may be provided, the innermost of which opens into a widening central funnel-shaped gap *u* formed between the two discs and through which the slime-oil mixture is supplied to the labyrinth gap. Instead of being disposed vertically as illustrated in the constructional example, the discs may alternatively be arranged horizontally, with suitable modification of the general arrangement.

Figures 3 and 4 are diagrammatic vertical sectional views indicating by means of circles the positions of the annular grooves and the possibility, as explained hereinbefore, of interrupting these annular grooves by the parts *v* which are uniformly distributed over the surfaces of the discs in such manner that on the disc *b*, Figure 4, their width increases in the outward direction and on the disc *a*, Figure 3, the width increases in the reverse sense. In this manner the cross-section of passage provided at any particular distance in the radial sense from the centre of the discs can be adjusted, for example to maintain it at the same value, and variations in the speed of throughflow can be compensated for.

Figures 5 and 6 illustrate, as will be clear without further explanation, in views corresponding to Figure 2, other possible methods of profiling the gap which according to Figure 5 has the same width throughout and is formed by a trapezoidal configuration of the inter-engaging ridges and grooves of the two discs whereas according to Figure 6 the width of the gap narrows continuously from the central zone of the disc assembly into which the turbid mixture is fed to the periphery from which said mixture passes. Alternatively in certain circumstances it is preferable that the arrangement should be such that the gap width is at its smallest towards the central zone of the disc assembly, i. e. at the innermost end of the gap, and widens out progressively or stepwise in the direction of the outlet. In all cases the turbid mixture may be supplied, for example, through the shaft *f* which is of hollow construction in which case the re-wetting oil will then be supplied from the side of the disc *a*.

Also in the various cases described, the gap between the two discs may be so adjusted by axial displacement of one of the discs, if necessary even during operation, that it is possible at will to obtain a film thickness which is most advantageous for the re-wetting operation, with the smallest possible consumption of energy.

The method of operation of the new apparatus will now be readily understood. The mixture to be treated, consisting of solid material, water and oil or other bituminous substances which can be used for the re-wetting, is introduced by a suitable supply means, preferably a device which forms a conically narrowing inlet zone, into the aforesaid gap, after the two disc bodies *a* and *b* have been set in motion at the desired rotational speed with respect to one another, passes through the gap under the action of centrifugal force, assisted by the simultaneous conveying effect of the movement of the disc bodies relatively to one another, is constantly caused to change direction and is finally delivered from the outer periphery of the discs.

The invention is, of course, in no way limited to the constructional forms described hereinbefore in detail and illustrated in the drawings and it is possible to make numerous modifications thereto, more particularly as regards the configuration of the gap profile. Thus, for example, in the case of readily re-wettable substances it is possible to achieve successful re-wetting even if the two discs which co-operate with each other are constructed with plain parallel surfaces, i. e. if the gap formed between them tapers, if so desired, in the outer direction without introducing any changes in direction.

We claim:

1. In a process for replacing with an oil film the water film of water-wetted, ultra-fine solid particles, wherein a mixture of said particles, water and oil is subjected to shearing and frictional forces, the improvement which comprises continuously forcing a very thin liquid film of the mixture through a zig-zag, labyrinth path provided between profiled surfaces rotating relatively one to the other, thus to subject the film to great shearing and frictional forces every time the flowing film changes direction in the path.

2. In a process for replacing with an oil film the water film of water-wetted, ultra-fine solid particles, a preponderant proportion of which have a grain size between 10 and 60 microns, and wherein a mixture of said particles, water and oil is subjected to shearing and frictional forces, the improvement which comprises forming a very thin, continuous liquid film of the mixture of between 0.1 and 3 mm. in thickness, while continuously forcing said film through a zig-zag, labyrinth path provided between profiled surfaces rotating relatively one to the other, thus to subject the film to great shearing and frictional forces every time the flowing film changes direction in the path.

References Cited in the file of this patent

UNITED STATES PATENTS

| Number | Name | Date |
| --- | --- | --- |
| 248,509 | Schmeja | Oct. 18, 1881 |
| 326,264 | Browne | Sept. 15, 1885 |
| 329,729 | Gathmann | Nov. 3, 1885 |
| 348,946 | Andree | Sept. 14, 1886 |
| 953,251 | Bartz | Mar. 29, 1910 |
| 1,137,994 | McKillip | May 4, 1915 |
| 1,420,164 | Trent | June 20, 1922 |
| 1,937,788 | Ross | Dec. 5, 1933 |
| 2,321,599 | Hofmann | June 15, 1943 |
| 2,412,680 | Fisher | Dec. 17, 1946 |
| 2,744,626 | Reerink et al. | May 8, 1956 |
| 2,750,120 | Pallmann | June 12, 1956 |

FOREIGN PATENTS

| Number | Country | Date |
| --- | --- | --- |
| 5,376 | Netherlands | Sept. 25, 1920 |
| 25,444 | Great Britain | 1911 |
| 214,521 | Great Britain | Apr. 24, 1924 |
| 944,751 | France | Nov. 8, 1948 |

OTHER REFERENCES

Colliery Engineering, October 1952, The Prall Mill, pages 433, 434, 439.